United States Patent [19]
Job

[11] 4,239,537
[45] Dec. 16, 1980

[54] PROCESS FOR THE PREPARATION OF FERRO LIME

[75] Inventor: Allen R. Job, Pincourt, Canada

[73] Assignee: Domtar Inc., Montreal, Canada

[21] Appl. No.: 38,588

[22] Filed: May 14, 1979

[51] Int. Cl.³ .................... C01F 11/00; C01G 49/00
[52] U.S. Cl. ................................ 75/257; 423/594; 75/30
[58] Field of Search .................... 423/594; 75/257, 30

[56] References Cited
U.S. PATENT DOCUMENTS

| | | | |
|---|---|---|---|
| 2,159,977 | 5/1939 | Nicholas | 75/41 |
| 2,806,776 | 9/1957 | Voale et al. | 75/5 |
| 3,311,465 | 3/1967 | Ban et al. | 75/55 |
| 3,519,386 | 7/1970 | Fedock et al. | 75/257 |
| 3,645,719 | 2/1972 | Minnick | 75/257 |
| 4,092,406 | 5/1978 | Job | 423/594 |

Primary Examiner—Herbert T. Carter
Attorney, Agent, or Firm—C. A. Rowley

[57] ABSTRACT

A method of making ferro-lime wherein fine iron containing particles are injected onto the surface of the lime in a kiln, between the discharge end of the kiln and the flame and while the lime is at a high temperature to react instantaneously with the iron in the fines thereby to produce ferro-lime. Also disclosed is a method of recovering the fines from ferro-lime production wherein ferro lime fines are injected into the kiln onto the surface of the lime between the discharge end of the kiln and the flame and while the lime is approximately at said temperature, thereby to agglomerate the fines onto the lime or ferro-lime product.

10 Claims, 1 Drawing Figure

U.S. Patent  Dec. 16, 1980  4,239,537
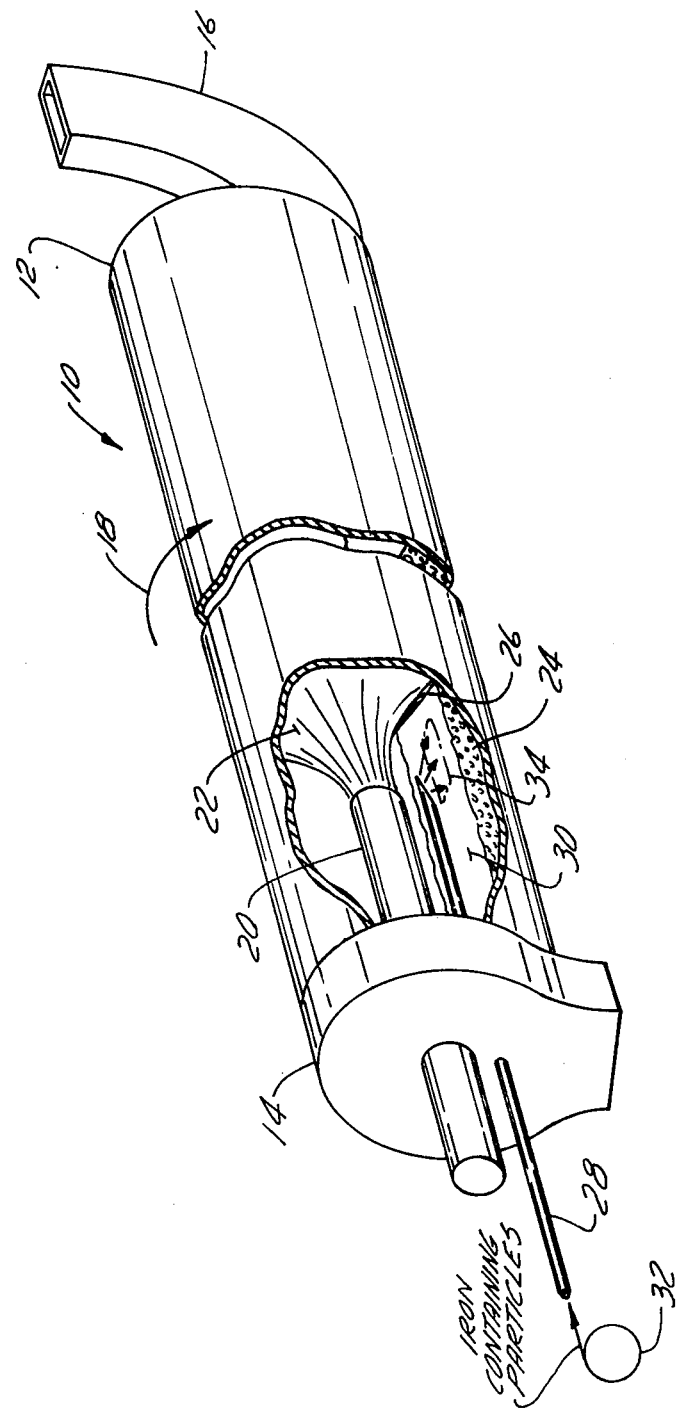

PROCESS FOR THE PREPARATION OF FERRO LIME

The present invention relates to a process for the production of ferro-lime in a rotary lime kiln, more specifically, the present invention relates to a process for the production of ferro-lime in a rotary lime kiln by injecting fine particles of iron containing material directly onto the surface of the lime shortly after formation thereof, and while the lime is at a temperature sufficiently high to react substantially instantly with the iron containing particles.

It is customary in smelting iron or steel to use limestone or lime as a fluxing agent for the removal of such impurities as silicon, phosphorus and sulphur. Both lime and limestone have disadvantages. Limestone must be calcined in the furnace which not only requires time but also robs the furnace of heat. Lime, on the other hand, slakes rapidly in a normal atmosphere, producing a dust problem, also it is a relatively bulky material which increases handling expense and charging time to the furnace.

It has been proposed to use ferro-lime as a fluxing agent in place of the lime and limestone previously used. Ferro-lime does not require calcining in the furnace and does not slake as easily as lime and thus overcomes the major disadvantages of these two prior fluxing agents. Ferro-lime has a further advantage in that the ferric content of the ferro-lime contributes to the production of the furnace and it incorporates into the slag much more rapidly.

Ferro-lime has not been used to any appreciable extent by the steel industry, presumably because no efficient method of making the ferro-lime has been available. It has been proposed to form the ferro-lime in a rotary kiln by various methods, for example, U.S. Pat. No. 2,159,977 issued May 30, 1939 to Nicholas teaches the concepts of spraying iron oxide into the kiln in a mixture with the fuel which is normally injected at the discharge end of the kiln; of injecting iron oxide at the feed or discharge end of the kiln by a separate air blast; or the disclosed preferred concept of feeding the treating agent (iron oxide) to the lime base as it is fed to the kiln. None of these methods as broadly taught in this patent are satisfactory.

The fines from a lime kiln operation are sometimes recovered by briquetting the fines to form a lime particle or agglomerate of a size acceptable to the customer. It is believed that a similar technique may be used for recovery of ferro-lime fines, however this technique requires extra capital expenditure for briquetting and related equipment.

It is an object of the present invention to provide an improved system for the production of ferro-lime.

It is a further object of the present invention to provide an improved system for recovery of fines from a ferro-lime producing process.

Broadly the present invention relates to producing a ferro-lime product in a rotary lime kiln by feeding limestone to the inlet end of the kiln, calcining the limestone to form a lime, heating the lime to a temperature of at least 1250° C. whereby it will instantly react with iron, injecting iron containing particles into the discharge end of the kiln and directing said particles onto the lime at said temperature whereby said iron reacts with said lime substantially instantaneously to form a ferro-lime.

The size of the injected particles may be up to ¼ inch maximum dimension, but generally will be less ⅛ inch the smaller the better to insure substantially instantaneous reaction between the iron and lime, but not so small as to create a problem of entrainment by the kiln gases, and care must be taken to ensure that substantial quantities of the injected material are not carried by the gases through the kiln and thus lost. To minimize problems in the kiln it is very important that the injected material react substantially instantaneously with the lime and that it be projected down onto the surface of the lime between the discharged end of the kiln and the flame. Clearly the particle size of the injected material should not be so large as to significantly reduce, by impact, the particle size of the lime being treated.

If the method of the present invention is to be used for the production of ferro-lime then the injected material may be in the form of iron containing materials such as magnetite, hematite, but preferably mill scale will be used. The reaction temperature is slightly different depending on the material injected. The stone fed to the kiln may be any suitable calcinable stone such as limestone, magnesite, dolomitic limestone or dolomite which will produce ferro-lime and ferro-dolime.

In any process for the manufacture of ferro-lime the resultant product will contain fines. These fines contain both lime and iron, and may contain a substantial quantity of the iron reacted with the lime because of the preferential reaction of the iron with the lime fines. If these fines are briquetted they will produce a high quality product containing probably on the average more iron than the regularly produced ferro-lime but probably will not be able to command a premium price.

The present invention provides a method of recovering ferro-lime fines and incorporating them into the regular lime production in a rotary lime kiln, and at the same time improving the distribution of the iron in the ferro-lime product.

The ferro-lime fines may be recovered by injecting these fines back into the kiln either with the iron containing material used to form the ferro-lime, or alternatively, through a separate injector. Since ferro-lime fines do not have to contact the lime at the reaction temperature between the lime and the iron, they may be injected somewhat closer to the discharge end of the kiln than the lime free iron particles, however, they must be injected onto the ferro-lime while the ferro-lime still is at a sufficiently high temperature to sinter with the fine ferro-lime particles being injected. Obviously care must be taken to insure the ferro-lime fines are not gas entrained.

The recovery of fines as described hereinabove may be used either with ferro-lime or ferro-dolime and is not restricted to the above described process of producing ferro-lime.

The injected iron containing particles such as mill scale or lime containing particles must contact a significant quantity of the lime in order to obtain proper penetration and distribution. As the iron oxide reacts with the lime to form ferro-lime, the iron tends to migrate through and between the lime particles to reach more uniform composition in the various lime particles and thus it is not essential that the mill scale or iron containing particles directly contact each piece of lime. It has been found that if the jet containing iron particles is applied to the lime for a distance along the length of the kiln at least twice the pitch of the helix on which the lime travels through the kiln, substantially all the lime will be treated (assuming sufficient iron containing particles are injected).

Care should be taken to ensure that the iron containing particles are projected down onto the bed of lime so that the particles do not contact the kiln lining and to better ensure that the particles are not easily gas entrained.

If the iron containing particles are fines from the ferro-lime operation it is not important that these fines contact all of the lime in the kiln. These fines fuse to the surface of the lime and thus the area of the jet on the surface of the lime is not as critical and is basically determined by the number of lime fines that have to be reinjected into the kiln.

Further features, objects and advantages will be evident from the following detailed description of specific examples of the preferred embodiments of the present invention taken in conjunction with the accompanying drawing in which, FIG. 1 is a schematic illustration of a rotary lime kiln with parts broken away to illustrate the present invention.

FIG. 1 illustrates a rotary lime kiln 10 having an inlet end 12 and a discharge end 14. Rock to be calcined is introduced at the inlet end 12 via the in-feed 16 and feeds along the interior of the kiln 10, as the kiln rotates in the direction of the arrow 18, along a helical path.

The kiln 10 is heated by means of a suitable burner such as the illustrated oil type burner 20 which forms a flame 22 extending along the kiln from adjacent the discharged end towards the inlet end. The last line of contact between the flame 22 and the bed 24 indicated by the line 26.

A lance 28 extends through the discharge end of the kiln 14 and terminates adjacent the top 30 of the bed 24 of lime travelling through the kiln. Suitable means are provided for entraining iron containing particles into an air stream formed by the blower 32 to inject the iron containing particles onto the surface 30 of the bed 24 in the area designated by the dot dash lines at 34. It will be noted that the area 34 is positioned between the front of the flame at 26 and the exit end 14 of the kiln 10. It will also be noted that the lance 28 is directed to project the iron containing particles down onto the surface 30 of the bed 24 so that there will be substantially no contact of the particles and the kiln wall and a minimum amount of entrainment of the small particles in the gases traversing the kiln. The length of the area 34 in the axial direction of the kiln 10 will preferably be at least twice the pitch of the helical path of the lime to insure proper contact between the particles and the lime.

It will be apparent that the addition of the iron containing particles may be stopped substantially instantaneously should some disruption occur in the kiln.

EXAMPLE 1

A 15 inch inside diameter kiln 30 feet long capable of producing 200 pounds of lime an hour with residence time of up to four hours was used to prove the concept of injecting iron containing fines onto the surface of the hot lime. A stainless steel lance having a ½ inch inside diameter was directed into the discharge end of the kiln so that the end thereof was adjacent the bed of lime between the flame and the discharge end of the kiln. Iron oxide fines (mill scale) were injected pneumatically through the lance onto the lime. To compensate for the air used to inject the lime fines, the air to the oil burner was reduced somewhat so that the air transporting the mill scale acted as a secondary combustion air for the kiln.

Limestone having a particle size in the range of about ⅜ to 1" was fed to the kiln and a substantially constant temperature of 1300° C. was maintained in the kiln at the point of injection of the mill scale. The amount of mill scale injected was varied during the test and the ferro-lime produced varied in color from a light buff to a jet black product with an iron content of less than 7½% Fe.

The mill scale was added in two different size ranges, namely minus 125 mesh and minus 20 mesh. The size of the mill scale addition made no significant changes in the resultant product.

An examination of the product indicated that ferro-lime lumps had white cores unless the ferro-lime lumps were less than about ½" in diameter.

In similar tests using dolomite the temperature of the kiln at the point of addition of the mill scale was maintained at about 1480° C. to obtain the instantaneous reaction. Under such conditions similar results were obtained as indicated hereinabove with respect to treatment of limestone.

EXAMPLE 2

Similar tests were conducted using (a) hematite fines and (b) magnetite fines.

With the hematite fines there was an immediate reaction but the temperature had to be increased to 1350° C. to optimize the reaction.

The magnetite reacted in a similar manner at essentially the same temperature as the hematite fines namely 1350° C.

In both the above tests the stone used was limestone at a size in the range of ⅜ to 1".

In order to test the concept of aglomeration of ferro-lime fines on the ferro-lime product in the kiln the following experiments were conducted.

EXAMPLE 3

One kilo of Jolette limestone approximately ½ to 1 inch mesh size was placed in a ceramic tray and dusted with 50 grams of pulverized ferro-lime which contained 5% iron. Two small piles of 5 grams each of loose pulverized ferro-lime were also placed on the end of the tray. The tray was then heated in the kiln to a temperature of 1400° C.

The ferro-lime had reacted with the lime produced and had penetrated 1/16 to ⅛ inch into the lumps. The loose material had thoroughly sintered into a uniform black lump.

It will be apparent from the above that the ferro-lime fines can be recovered by injecting them into the kiln and having them agglomerate with the ferro-lime product as it is formed.

Having described the invention, modification will be evident to those skilled in the art without departing from the spirit of the invention as defined in the appended claims.

What is claimed is:

1. A method of producing at least one of ferro-lime and ferro-dolime in a rotating kiln having an inlet end and a discharge end and a flame extending along said kiln to heat the kiln to the required temperature for calcination, introducing a calcinable alkali earth composition at the inlet end of said kiln, calcining said composition and heating said composition to a temperature to substantially instantaneously combine with iron contained in particles injected to the kiln, injecting said particles having a maximum dimension of less than ¼ inch into said kiln and onto the surface of said calcined composition between the discharge end of said kiln and said flame and where said calcined composition is at a temperature to instantaneously react with said iron, instantaneously combining said iron content of said particles with said calcined composition thereby to form a product comprising at least one of ferro-lime and ferro-dolime in said kiln and withdrawing said product from the discharge end of said kiln.

2. A method as defined in claim 1 wherein said temperature to substantially instantaneously combine with iron contained in said iron containing particles is sufficiently high to insure substantially instantaneous reaction of said iron contained in said particles with calcined composition formed by calcining said calcinable alkali earth composition.

3. A method as defined in claim 1 wherein said temperature is at least 1250° C.

4. A method as defined in claim 2 wherein said composition is limestone.

5. A method as defined in claim 2 wherein said composition is selected from the group consisting of dolomite, magnesite and dolomitic limestone.

6. A method as defined in claims 1, 2 or 4 wherein said iron containing particles are particles of iron oxide.

7. A method as defined in claims 1, 2 or 4 wherein said iron containing particles are magnetite ore particles.

8. A method as defined in claims 1, 2 or 4 wherein said iron containing particles are hematite ore particles.

9. A method as defined in claims 1 wherein said iron containing particles are ferro lime fines.

10. A method as defined in claims 1, 2 or 4 wherein said calcined composition formed in said kiln travels on a helical path through said kiln and wherein said iron containing particles are injected along a distance axial of said kiln of at least twice the pitch of said helix.

* * * * *